J. B. COBB, Jr.
SAFETY SWITCH POINT.
APPLICATION FILED DEC. 21, 1912.
1,089,903.
Patented Mar. 10, 1914.
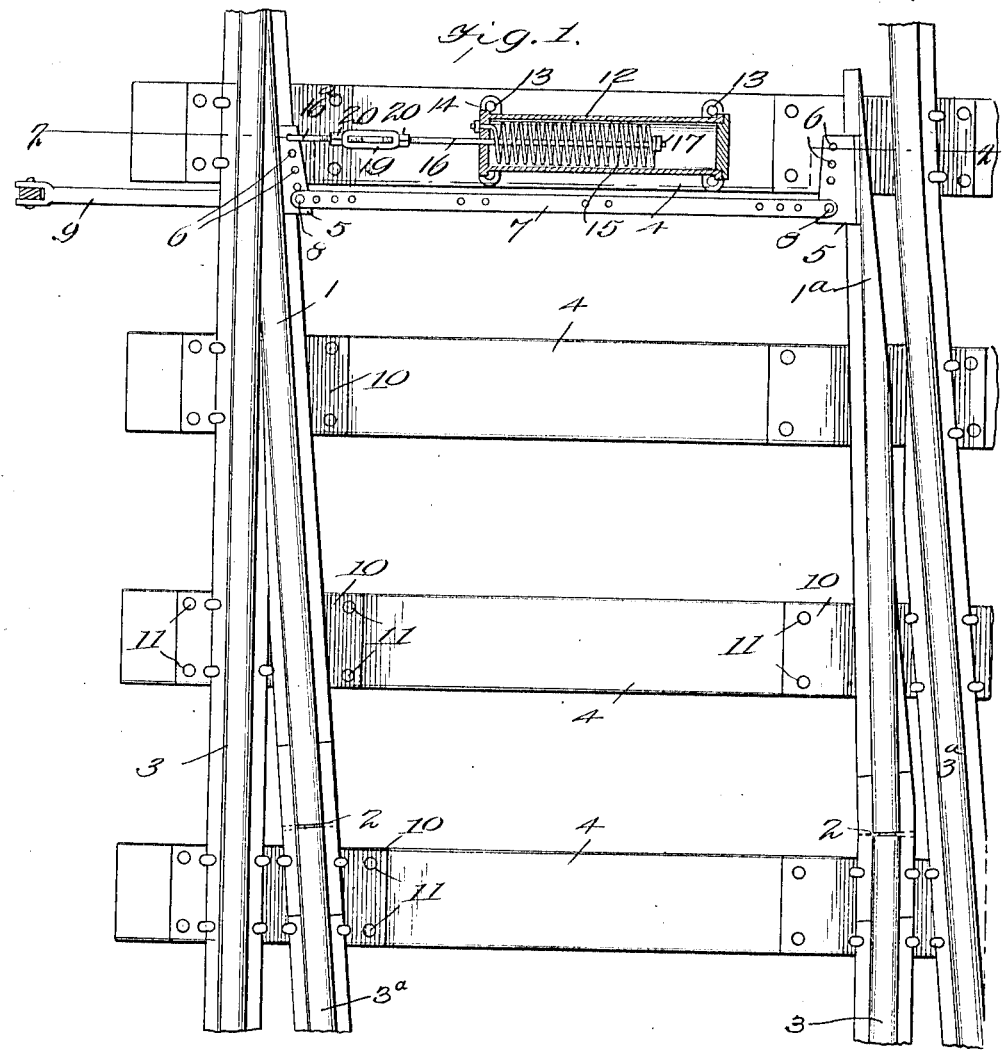
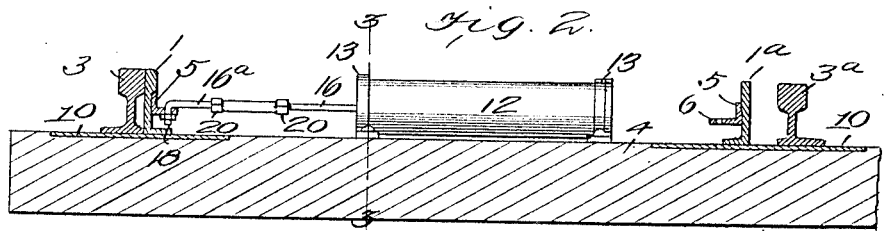
WITNESSES
F. C. Barry
C. E. Trainor
INVENTOR
Joseph B. Cobb, Jr.
BY Munn & Co.
ATTORNEYS

UNITED STATES PATENT OFFICE.

JOSEPH B. COBB, JR., OF SHAWNEE, OKLAHOMA.

SAFETY SWITCH-POINT.

1,089,903.

Specification of Letters Patent. Patented Mar. 10, 1914.

Application filed December 21, 1912. Serial No. 737,963.

*To all whom it may concern:*

Be it known that I, JOSEPH B. COBB, Jr., a citizen of the United States, and a resident of Shawnee, in the county of Pottawatomie and State of Oklahoma, have invented certain new and useful Improvements in Safety Switch-Points, of which the following is a specification.

My invention is an improvement in safety switch-points, and has for its object the provision of a switch-point of the character specified, wherein the points will be at all times held in normal position regardless of defects in the switch, stand, or the connecting rod.

In the drawings: Figure 1 is a plan view of a switch provided with the improvement, showing the points in normal position, the spring holding cylinder being in section. Fig. 2 is a section on the line 2—2 of Fig. 1; and, Fig. 3 is a section on the line 3—3 of Fig. 2.

The present embodiment of the invention is shown in connection with a pair of siding or low speed rails 3 and a pair of main line or high speed rails 3ª. The points 1 and 1ª are hinged at 2, to the innermost members of the adjacent members of the pairs of rails 3 and 3ª, the rails being secured to the ties 4 in the usual manner. The point 1 is hinged to one of the rails 3ª and the point 1ª is hinged to one of the rails 3. A plate 5 is secured to each point near the extremity thereof, and each of the plates is provided with a plurality of openings 6 at its outer edge. A connecting rod 7 is provided for connecting the points, the said rod being secured to the plates 5 by means of bolts 8, each bolt passing through an opening in the rod and one of the openings 6 of the adjacent plate.

The operating mechanism for the switch, not shown, is connected to the rod 7 in the usual manner, by means of a link 9, the said link being connected to that end of the rod adjacent to the operating mechanism. Wear plates 10 are secured to the ties beneath the rails, by means of spikes 11, and the points move on the wear plates.

A cylinder 12 of suitable size is secured to the tie at the ends of the points, by means of bearing brackets 13, the said brackets encircling the ends of the cylinder, and being secured to the tie by bolts or spikes 14. A coil spring 15 is arranged in the cylinder, and a rod 16 has one of its ends connected to one end of the spring, as indicated at 17, and the other end of the spring is connected to the cylinder in any suitable manner. The rod 16 is sectional, and that section 16ª of the rod remote from the spring is provided with a hook 18 for engaging one of the openings 6 of the plate 5 adjacent to the operating mechanism. The meeting ends of the sections 16 16ª are oppositely threaded, and a double nut 19 connects the said ends. The ends of the nut are oppositely threaded, so that when the nut is turned the sections of the rod will be moved toward and from each other, depending upon the direction of rotation of the nut. The rod sections and the nut form a turnbuckle, for permitting the length of the rod, that is the connection between the spring and the plate, to be varied. A lock nut 20 is threaded onto each rod outside the nut, for locking the nut in adjusted position. The rod 16 passes into the cylinder, and is connected to that end of the spring remote from the turnbuckle, so that the spring acts normally to hold the points in the normal position shown. The arrangement is such, that there is from 35 to 50 pounds pressure acting to hold the points in the position shown in Fig. 1, and from 50 to 65 pounds pressure when the points are moved to the opposite side, that is when the switch is open. In other words, 35 to 50 pounds pressure acts to hold the switch closed when it is closed, and from 50 to 65 pounds acts to close the switch when it is open.

I claim:—

1. The combination with the switch points, and the rails with which the said points coöperate, of a cylinder arranged between the points, a spring within the cylinder, a sectional rod, a turnbuckle connection between the meeting ends of the sections of the rod, one of the sections of the rod extending into the cylinder and being connected with the spring, the other end of the spring being connected with the cylinder, a plate connected to each point in approximate alinement with the cylinder, each plate having a series of openings extending longitudinally of the point, the other section of the rod having a hook for engaging one of the openings, said spring acting normally to hold the points in closed position, means for locking the sections of the rod in adjusted position, and a connection between the points for causing the said points to move together.

2. The combination with the switch points, and the rails with which the said points coöperate, of a cylinder arranged between the points, a spring within the cylinder, a sectional rod, a turnbuckle connection between the meeting ends of the sections of the rod, one of the sections of the rod extending into the cylinder and being connected with the spring, the other end of the spring being connected with the cylinder, the other section of the rod being connected with one of the points, said spring acting to hold the points in closed position, and a connection between the points for constraining them to move together.

3. The combination with the switch points, and the rails with which the points coöperate, of yielding means for pressing the points toward one rail to hold the points in closed position, said means comprising a casing secured between the points and at approximate right angles thereto, a spring in the cylinder, a sectional rod, a turnbuckle connection between the adjacent ends of the sections, one of said sections being connected to the spring and the other to one of the points, said spring being connected to the casing at the other end from the rod.

JOSEPH B. COBB, Jr.

Witnesses:
W. L. CHAPMAN,
W. F. VARNUM.

---

Copies of this patent may be obtained for five cents each, by addressing the "Commissioner of Patents, Washington, D. C."